(12) United States Patent
Runge

(10) Patent No.: US 6,254,070 B1
(45) Date of Patent: Jul. 3, 2001

(54) SHOCK ABSORPTION MOUNT

(75) Inventor: Samuel A. Runge, Suffolk, VA (US)

(73) Assignee: Newport News Shipbuilding and Dry Dock Company, Newport News, VA (US)

(*) Notice: Subject to any disclaimer, the term of this patent is extended or adjusted under 35 U.S.C. 154(b) by 0 days.

(21) Appl. No.: 09/462,235
(22) PCT Filed: Jul. 1, 1998
(86) PCT No.: PCT/US98/14021
§ 371 Date: Jan. 4, 2000
§ 102(e) Date: Jan. 4, 2000
(87) PCT Pub. No.: WO99/01678
PCT Pub. Date: Jan. 14, 1999

Related U.S. Application Data
(60) Provisional application No. 60/051,667, filed on Jul. 3, 1997.

(51) Int. Cl.⁷ .......................................... F16F 3/08
(52) U.S. Cl. .................... 267/152; 267/153; 267/160; 248/628
(58) Field of Search ..................... 267/152, 153, 267/141, 141.1, 141.2, 292, 294, 160, 164; 248/637, 638, 634, 615, 626, 628, 604, 619, 629, 630, 636

(56) References Cited

U.S. PATENT DOCUMENTS

| | | |
|---|---|---|
| 2,689,464 | 9/1954 | Wurtz . |
| 2,893,665 | 7/1959 | Paulsen . |
| 2,913,215 | 11/1959 | Kerley, Jr. et al. . |
| 3,066,905 | 12/1962 | Gertel . |
| 4,172,590 | 10/1979 | Jarret et al. . |
| 4,752,058 | 6/1988 | Weber ................................ 248/638 |
| 5,167,396 | 12/1992 | Burba et al. ....................... 248/610 |
| 5,217,198 | 6/1993 | Samarov et al. . |
| 5,358,210 | 10/1994 | Simon et al. . |

Primary Examiner—Robert J Oberleitner
Assistant Examiner—Pamela J. Rodriguez
(74) Attorney, Agent, or Firm—Lalos & Keegan

(57) ABSTRACT

The present invention is a novel shock-absorbing mount (20) to protect shock sensitive equipment mounted thereon. It has a configuration of a C shape but contains various angles therein to increase the utility and agility of the shock absorbing mount (20). These angles are specifically derived to allow the shock-absorbing mount (20) to fully absorb extreme shock energy without transferring it to the equipment.

21 Claims, 3 Drawing Sheets

SHOCK ABSORPTION MOUNT

This application is a 371 of PCT/US98/14021 filed Jul. 1, 1998 which claims the benefit of provisional No. 60/051,667 filed Jul. 3, 1997.

The present invention is related to a shock wave absorption mount for mounting shock wave sensitive equipment thereon. In particular, the present invention is in the field of structural shock absorbing mounts for reducing shock transfer to and excursions of mounted equipment.

BACKGROUND OF THE INVENTION

In equipment mounting applications involving equipment of a sensitive nature, it is often necessary to provide some means to absorb input excitations due to shock. Equipment rigidly mounted directly to floors or decks may experience direct transfer of shock to sensitive components.

In military shipboard applications in particular, equipment has had to undergo rigorous testing. These equipment must meet numerous specifications including the ability to sustain the shock from an underwater explosion resulting in a force magnitude potentially in the hundreds of Gs being transferred to the equipment. While such equipment has traditionally been custom designed to meet such rigorous specifications, a parallel trend has also emerged in the procurement of military and government hardware.

Custom equipment, while long preferred by military and government activities for its ability to meet or exceed performance and survivability requirements, has been found to be more expensive to purchase, install, and maintain. Concurrently, commercial grade equipment, particularly electronic equipment, has now advanced to a state where the capability of commercially available systems meets or exceeds the capability of custom specified equipment and is readily available. Hence, Commercial-Off-The-Shelf (COTS) equipment has become a preferred source for military and government hardware, offering, as the name implies, the ability of such equipment to be purchased directly from commercial vendors and immediately deployed.

Oftentimes however, COTS equipment may be inadequately ruggedized or fall short of other environmental requirements. Accordingly, COTS equipment must be adapted to be more rugged, watertight, and the like. COTS electronics equipment has traditionally overcome some of these limitations by being adapted for mounting upon special mounts purporting to limit shock transfer. Prior art mounts however, such as wire cable mounts, have proven deficient in that they fail to provide adequate shock damping action. Prior art mounts are further disadvantageous in that they are bulky and require more parts and steps to manufacture.

It would be appreciated in the art therefore for a compact means to mount COTS equipment in such a way that shock loads may be sustained without damaging the equipment. It would also be useful in the art for a shock mount to attenuate various destructive frequency components thus isolating and protecting mounted equipment from associated damages.

SUMMARY OF THE INVENTION

The present invention is a compact shock absorbing mount for placing equipment upon a structural base, deck or bulkhead. The shock absorbing mount of the present invention has the capability to dampen high frequency vibrations due to shock input excitations in all directions. One leg of the C-shape mount is fastened to the equipment, and the other leg to the base structure. The lengths of intervening sections, their angles with respect to one another, the material of the mount and its thickness result in a mount that has unexpectedly high shock damping properties. The mount is simple to fabricate and install. It is also well suited to an industrial/marine/aircraft environment.

DETAILED DESCRIPTION OF THE INVENTION

Figure 1:
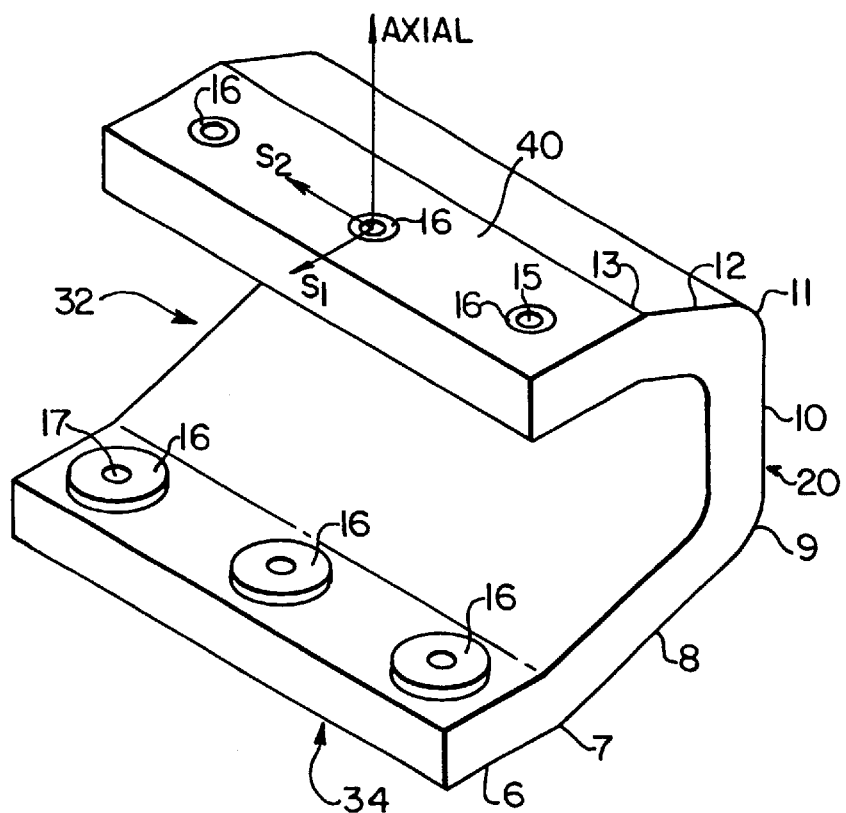
FIG. 1 is a perspective view of the present invention.
Figure 2:
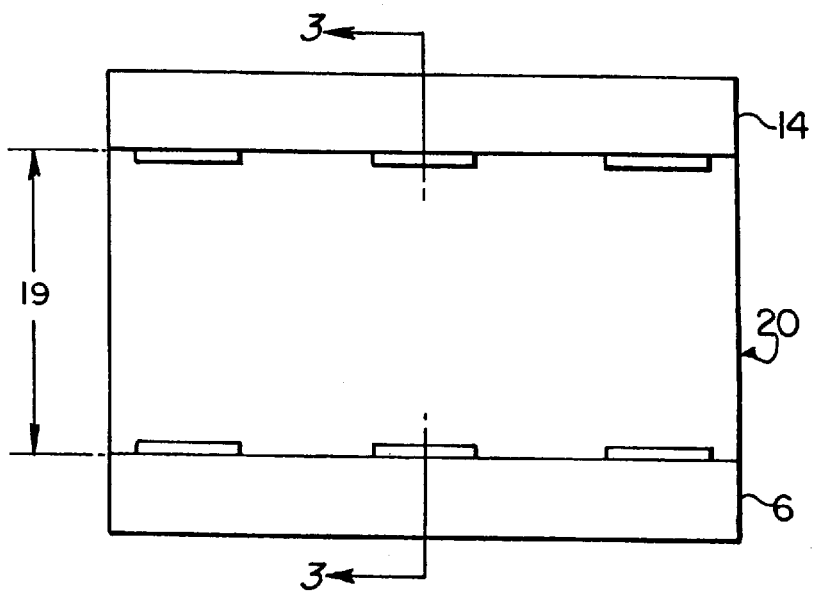
FIG. 2 is a front view of the present invention illustrating place mounting holes and bushings.
Figure 3:
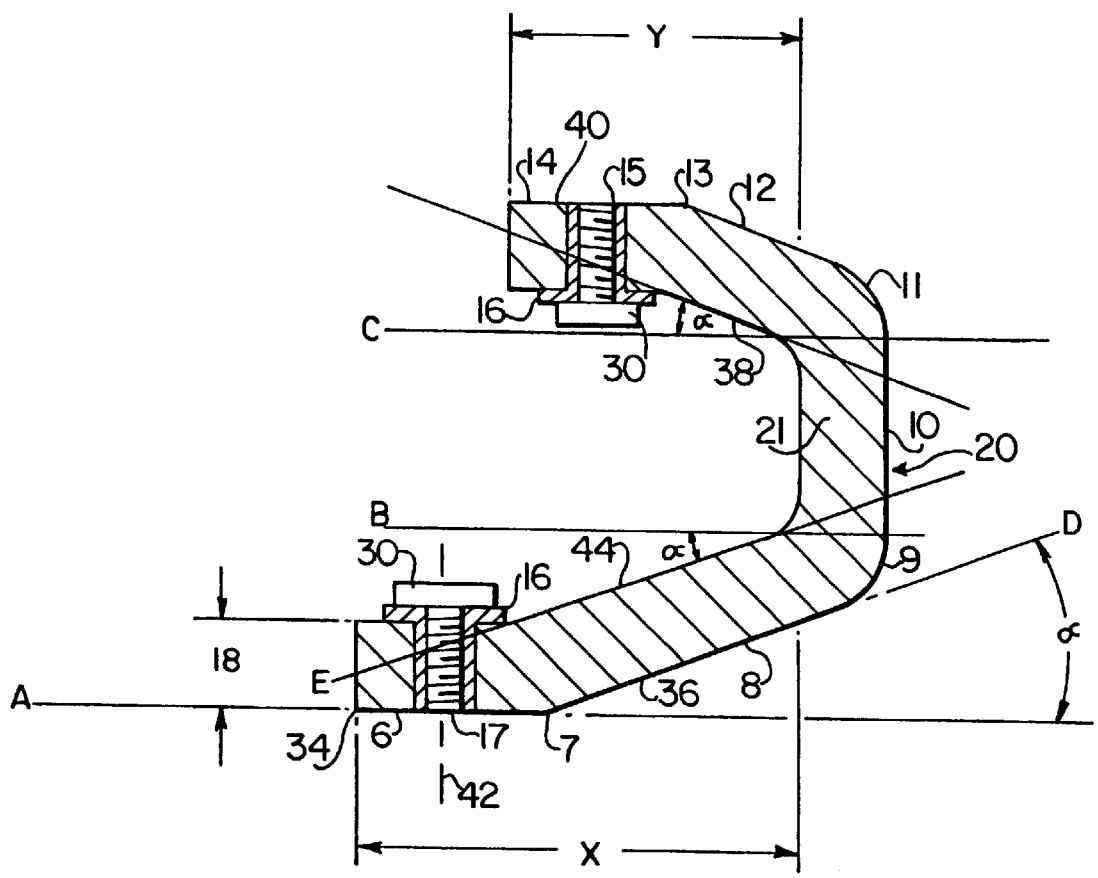
FIG. 3 is a diagram illustrating a cross section taken along line 3—3 of FIG. 2 showing the C-shaped mount of the present invention including bushings and mounting screws.
Figure 4:
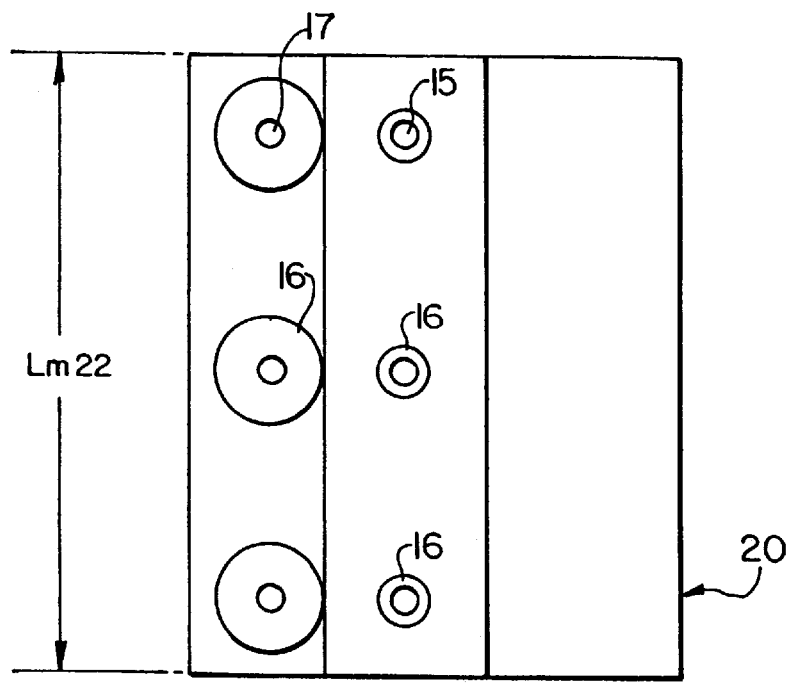
FIG. 4 is a top view of the present invention illustrating placement of mounting holes and bushings.

Shock absorbing mount 20 of the present invention, as shown by its perspective view in FIG. 1 and its cross section view in FIG. 3, is disposed between the structure of a ship and the edge or base of a piece of electronic equipment. Shock isolation is achieved in shock absorbing mount 20 through a combination of structural configuration and material composition. In the preferred embodiment, to achieve the desired isolation parameters, shock-absorbing mount 20 is constructed of a resilient material having a tensile modulus of elasticity between 20,000 and 50,000 psi with the preferred value being 25,000 psi.

Referring to FIG. 1 of the drawings, mount 20 of the present invention has a structural configuration of roughly a C-shape formed by planar sections including a base section 6, a lower intermediate section 8, a middle section 10, an upper intermediate section 12 and a top section 14 surrounding an internal space 32. This space is coextensive with the mount and not intruded by any of the sections when the mount and equipment are at rest. Base or bottom section 6 and top section 14 are each of sufficient lateral extension to provide flat surfaces 34 and 40 forming flat horizontal planes as shown in FIG. 1 to permit the formation of holes 17 whereby each hole accommodates a bushing 16. Bushings 16 receive mounting screws 30 in both the base and top sections 6 and 14, to correspondingly form first and second attaching means. The purpose of the bushings 16 is to provide a hard surface on which screws 30 may be bottomed to attain full tightening torque. The C shape mount has a characteristic that when an imaginary perpendicular plane 42 is drawn, only one section protrudes the imaginary plane as shown in FIG. 3, when the equipment and mount are at rest.

The base section 6 meets the lower intermediate section 8 at bending point 7 where the lower intermediate section 8 then slopes linearly upward (inclining) at a predetermined angle to form a space above the flat horizontal plane of flat surface 34. Bending point 9 is formed by the intersection of the lower intermediate section 8 and the middle section 10. As shown in FIG. 3, the middle section 10 is generally vertical and is at right angles with the base section 6 of the shock-absorbing mount. Similarly, bending point 11 is formed by the intersection of the middle section 10 and the upper intermediate section 12 from which the upper intermediate section 12 slopes linearly downward (declining).

Finally at bending point 13, the top section 14, being parallel to the base section 6, intersects the upper intermediate section 12.

To illustrate the angular relationships among the various sections, lines A, B, C, D, E, and F are drawn on FIG. 3. Line A is defined to be parallel to and located, as shown, at the outer flat surface 34 of base section 6. Line B is defined to be parallel to line A, and perpendicular to and located at the lower end of the middle section 10. Line C is defined to be parallel to line B, and perpendicular to and located at the upper end of the middle section 10. Line D is defined to be parallel to and located at the outer flat surface 36 of the lower intermediate section 8. Line E is defined to be parallel to and located at the interior flat surface 44 of the lower intermediate section 8. Line F is defined to be parallel to and located at the interior flat surface 38 of the upper intermediate section 12. The angle formed between lines A and D is identical to the angle formed between lines B and E, as well as the angle formed between lines C and F. These angles are each designated as α.

The lower intermediate section 8 and the upper intermediate section 12 are each at an angle α with respect to the structural base. These angles should be substantially within the range of about 5°–30°, but preferably 10°–30° with substantially about 20° most preferable. These angles need not be equal and may vary one from another by 10 to 20 degrees. This range allows all sections of mount 20 to retain their collective configuration as much the same as possible under severe shock.

If angle α were larger than about 30°, keeping other parameters much the same, middle section 10 would continue to diminish its effectiveness as the angle α continues to increase. This would remove a significant amount of material from the energy absorbing function of the mount, and would mean the juncture of sections 8 and 12 would be so sharp as to raise stress levels in the material to intolerable levels.

The upper intermediate section 12 is shorter than the lower intermediate section 8 to prevent damage to shock absorbing mount 20 in the extreme travel of the sections under severe shock. If the upper intermediate section 12 were extended to have the same length as the lower intermediate section 8, the base section 6 and the top section 14 could collide under shock loading. This would allow screws 30 in holes 15 to have metal to metal contact with screws 30 in holes 17. This metal to metal contact would negate the purpose of the mount, and would probably damage the bushings 16 or mounting screws 30. This problem of metal to metal contact can also be prevented by making the upper intermediate section 12 longer than the lower intermediate section 8.

Adapting shock absorbing mount 20 to a particular application and weight of equipment can include selection of material 21, thickness 18, lengths of sections 6, 8, 10, 12, and 14 and overall length 22, and various other factors.

Material 21 may be any thermoplastic polyester elastomer with a tensile modulus of elasticity within a range of 20,000–50,000 psi, preferably 25,000 psi. Particularly suitable for this application is a material known as Dupont® brand Hytrel® as disclosed in U.S. Pat. No. 4,264,761, U.S. Pat. Nos. 3,954,689, and 3,775,373, all being incorporated herein by reference. This material has the required structural dynamic properties, is impervious to most solvents and other agents with an expected life in severe environments of 10–30 years, and has a high creep resistance.

Figure 5:
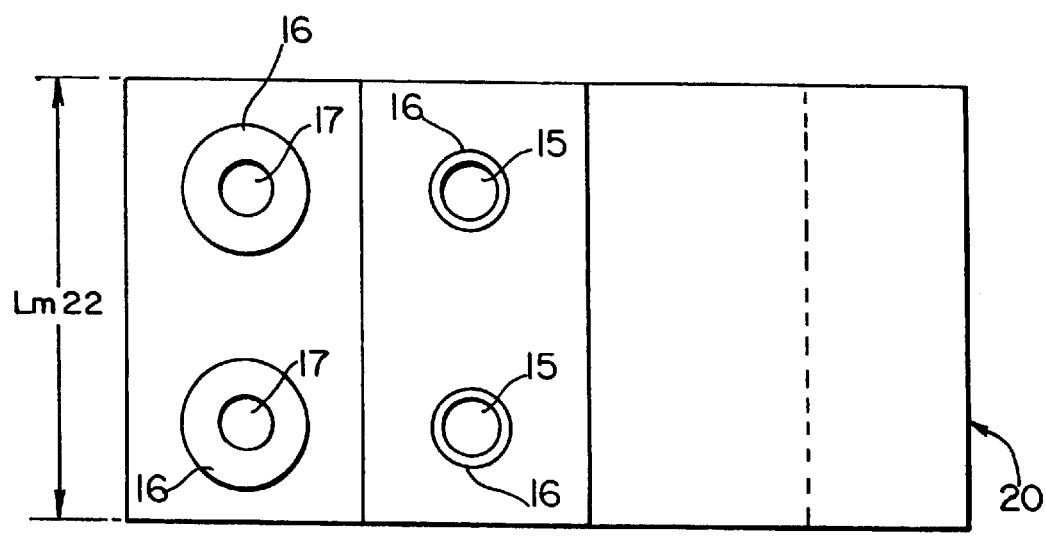
FIG. 5 is a top view of the present invention illustrating a four-hole embodiment.

Any impulsive force, such as a shock caused by an explosion, generates energy across a wide frequency range. Much of the damage caused by an explosion depends upon the sensitivity of the equipment to the amount of shock energy present at various frequencies. It is known that damage to equipment, particularly sensitive electronic equipment, may be minimized if a resonant frequency between 5 and 15 Hz is maintained for the shock absorbing mount 20. Accordingly, to best isolate such equipment from shock, the shock absorbing mount 20 of the present invention must absorb energy outside this range limiting equipment acceleration and excursions to non-destructive values. Assume for a preferred embodiment of mount 20 of material 21 as shown in FIG. 5 that:

mount capacity=68 lbs
tensile modulus of elasticity=25,000 psi
$L_m$: mount length 22=3 in
α: angle between sections=20°
length of section 6=1.25 in
length of section 6+ section 8 shown as X=3.75 in.
length of section 12+section 14 shown as Y=2.50 in
length of section 14=1.25 in
thickness 18=0.75 in
height 19=3.00 in Analyzing this mount by well-known methods of structural dynamics analysis, the natural frequency of the shock absorbing mount 20 is 10.1 Hz in the axial direction, 10.2 Hz in the shear1 (S1) direction, and 9.5 in the shear2 (S2) direction, as shown in FIG. 1. In all directions, the natural frequency was within the design limits between 5 and 15 Hz. While values selected for lengths of sections 6, 8, 10, 12 and 14 by way of this example represent values used in the preferred embodiment of the invention, lengths of sections 6, 8, 10, 12 and 14 may be varied along with thickness 18 and length 22 to scale the shock absorbing mount 20 up and down for larger and smaller loads. The shock absorbing mount 20 in the preferred embodiment, however, may be initially scaled by varying only the thickness 18 and the length 22. The natural frequency response may be preserved by maintaining the relative proportions between lengths of sections 6, 8, 10, 12 and 14 while making appropriate modifications to thickness 18. If necessary, material 21 may be substituted with a material having a greater or lesser modulus of elasticity. By the same token, shock absorbing mounts for heavier or lighter equipment may be sized by varying the material 21, thickness 18 of various sections, the lengths of the various sections and the length $L_m$ of the shock absorbing mount.

While the preferred embodiment is drawn to a mount for isolating shipboard equipment from underwater shock, the shock absorbing mount of the present invention in alternative embodiments, could be used anywhere such shock isolation was desired. For example, mobile mounted equipment in trucks, van, aircraft, space vehicles, rockets, missiles, or the like could be shock isolated using the mount of the present invention. Moreover, the mount could be used in any environment where shock is likely to be encountered, such as earthquake prone structures including buildings, bridges, etc.

I claim:

1. A shock absorption mount, comprising:
   a C-shape elongated unibody of resilient material including an internal space and having a resilient top section and a resilient bottom section,
   said bottom section having a surface on the bottom of said bottom section forming a bottom surface plane,
   a supporting section having a plurality of planar sections adjoining to form angles within the interior of said internal space, said supporting section contacting said bottom section only at a bending point and sloping upwardly to form a spacing above said bottom surface plane.

2. The shock absorption mount of claim 1, further comprising:

a plurality of holes formed in each of the top and bottom sections; and a plurality of bushings each being inserted into the plurality of holes from inside the C shape.

3. The shock absorption mount of claim 2, further comprising:

first attaching means for attaching the bottom section to a base structure; and second attaching means for attaching the top section to a device sensitive to vibrations;

wherein the attached device sensitive to vibrations is substantially parallel to the base structure.

4. The shock absorption mount of claim 1, the supporting section further comprising a middle section having a first end connected to an upper intermediate section and a second end connected to a lower intermediate section forming a C.

5. The shock absorption mount of claim 1, wherein the bottom section protrudes further outwardly forming the C-shape than said top section.

6. The shock absorption mount of claim 1 wherein said spacing forms an angle separating said supporting section from said bottom surface plane.

7. The shock absorption mount of claim 1 wherein said bottom section plane solely contacts a base.

8. A shock absorption mount for mounting equipment on a base structure, comprising:

a top section;

a linearly declining section;

an intermediate middle section;

a linearly inclining section; and a bottom section solely supporting the above sections at a flexible bending point and being the only section in contact with said base structure;

wherein the top section, the linearly declining section, the intermediate middle section, the linearly inclining section and the bottom section sequentially join together forming a C-shape.

9. The shock absorption mount of claim 8 wherein, said bottom section is formed with a parallel surface on the bottom of said bottom section forming a bottom surface plane for contact with said base structure.

10. The shock absorption mount of claim 8 wherein, said bottom section is formed with a parallel surface on the bottom of said bottom section forming a bottom surface plane for contact with said base structure, and said above sections supported by said bottom section form a spacing above said bottom surface plane.

11. The shock absorption mount of claim 8 wherein, said bottom section is formed with a parallel surface on the bottom of said bottom section forming a bottom surface plane for contact with said base structure, and said above sections supported by said bottom section form a spacing above said bottom surface plane, said spacing forms an angle separating said supporting section from said bottom surface plane.

12. A shock absorption mount, comprising:

a generally C-shaped elongated unibody constructed of a resilient material having a resilient top section, a resilient bottom section, and a supporting section;

said supporting section including an inclining section, an intermediate middle section, and a declining section;

one end of said intermediate middle section contacting the declining section and the other end of said intermediate middle section contacting the inclining section;

said bottom section having a bottom surface for contacting a base to define a bottom surface plane;

said supporting section contacting said bottom section only at a bending point and sloping upwardly to form a spacing above said bottom surface plane.

13. The shock absorption mount of claim 12, wherein the resilient material comprises a thermoplastic polyester elastomer.

14. The shock absorption mount of claim 13, wherein said support section is of a uniform thickness.

15. The shock absorption mount of claim 12, wherein the resilient material comprises a material having an elastic modulus in the range of about 20,000 to 50,000 psi.

16. The shock absorption mount of claim 12, wherein the resilient material is a thermoplastic polyester elastomer having an elastic modulus in the range of about 20,000 to 50,000 psi.

17. The shock absorption mount of claim 12, wherein the resilient material is a thermoplastic polyester elastomer and wherein the natural frequency of the mount is in the range of about 5 to 15 Hz.

18. The shock absorption mount of claim 12, wherein the support section is of a uniform thickness.

19. The shock absorption mount of claim 12, wherein the natural frequency is in the range of about 5 to 15 Hz.

20. The shock absorption mount of claim 12, wherein said spacing forms an angle separating said supporting section from said bottom surface plane.

21. The shock absorption mount of claim 12 wherein said bottom section plane solely contacts said base.

* * * * *